(12) United States Patent
Johnson

(10) Patent No.: US 7,137,764 B2
(45) Date of Patent: Nov. 21, 2006

(54) CARGO MANAGEMENT SYSTEM FOR TRAILERS AND TRUCKBEDS AND METHOD OF USE

(76) Inventor: Gary Johnson, 1925 SW. Vista Ave., Portland, OR (US) 97201

( * ) Notice: Subject to any disclaimer, the term of this patent is extended or adjusted under 35 U.S.C. 154(b) by 72 days.

(21) Appl. No.: 10/982,887

(22) Filed: Nov. 8, 2004

(65) Prior Publication Data

US 2006/0099044 A1 May 11, 2006

(51) Int. Cl.
*B61D 45/00* (2006.01)
(52) U.S. Cl. ..................................... 410/101
(58) Field of Classification Search ........... 410/97, 410/3–4, 7–8, 19, 77, 52, 56, 58, 78, 84–85, 410/98, 101, 102; 24/265 CD, 115 K; 248/499
See application file for complete search history.

(56) References Cited

U.S. PATENT DOCUMENTS 4,027,892 A * 6/1977 Parks ............................ 410/3

\* cited by examiner

*Primary Examiner*—H Gutman
(74) *Attorney, Agent, or Firm*—Dennison, Schultz & MacDonald

(57) ABSTRACT

A configurable base is formed from a plurality of interlocking tiles that may fit within a frame. Anchoring tiles have receptacles for accepting anchors. Smooth panels support heavy items. Accessories are formed to either attach to the anchor or integrally with the anchor. Accessories include tie downs, sidewalls, cross frame and stanchions, and wheelchocks. The anchor fits into the receptacles for placement anywhere desired on the base. An embodiment of the anchor has a lock for added security. A coupler provides at least one aperture for securing items, preferably positioned on the frame. An alternative configurable bed is formed by orthogonal cross members arranged within a frame. Open spaces between the orthogonal cross members accept anchors. Another alternative configurable bed is formed from a single tile having a plurality of receptacles. A method of configuring a cargo management system allows a dealer employee to compare customer needs to established footprints, alter the footprint design if needed, and generate a cost estimate for the configuration.

14 Claims, 12 Drawing Sheets

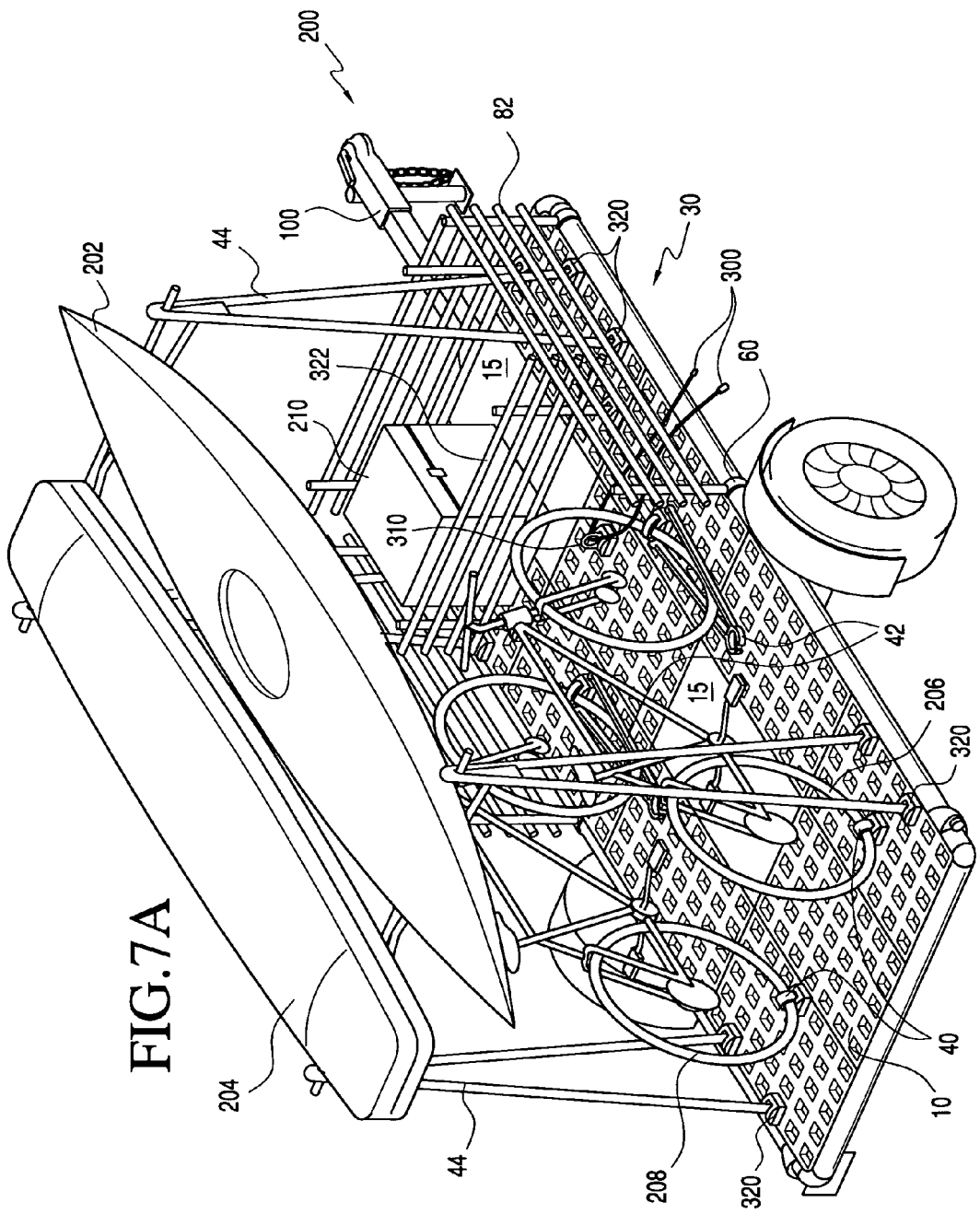

CARGO MANAGEMENT SYSTEM FOR TRAILERS AND TRUCKBEDS AND METHOD OF USE

BACKGROUND OF THE INVENTION

1. Field of the Invention

The present invention relates to devices, systems, and processes useful for cargo management in utility trailers, truck beds, and the like.

2. Brief Description of the Related Art

Utility trailers and truck beds are used to haul a wide variety of items. Individuals often carry bikes, kayaks, and camping equipment. A power sports enthusiast may carry one or more of motorcycles, all-terrain vehicles, snowmobiles, or personal watercraft. A person moving household goods might want to carry mattresses, furniture, and boxes. A person repairing or maintaining the landscaping or garden area of a home might need to carry soil, shrubbery, and a riding mower home from the store. Any of these activities often involve carrying a number of differently shaped items securely on a utility trailer or pickup truck bed.

One problem typically encountered when carrying such items is adequately securing them to prevent shifting and movement during transit. Traditionally, the person carrying these items has had to string a labyrinth of bungee cords and ropes in an attempt to keep these items held securely. Unfortunately, too many people are not sufficiently experienced with hauling such items, tying secure knots, or don't have the correct tools to keep such items securely anchored. It is quite common that, as a result, the items are not properly secured, become loose from their restraints and shift during transit. In some cases, loose or shifting cargo may even fall out of the trailer or vehicle, potentially causing accidents and harm to other drivers.

Another problem in the utility hauling field is that no interchangeable platform is available to readily accommodate articles of various shapes and sizes. Instead, one must typically purchase equipment specific to each type of item or items to be hauled. Specialized equipment, especially for items such as skis or kayaks, must often be installed on to a luggage rack at the car dealership. Moreover, these specialty racks are not interchangeable, and typically do not allow a person to accommodate more than one type of cargo.

Still another problem found with current utility truck or trailer bed configurations is not having sufficient tie-downs in the location where they are needed. Too often, bungee cords don't quite reach to the nearest hole in the truck bed side panels, or there aren't sufficient tie-down points available for all the items to be secured. Rope may be used, but the average person often does not adequately arrange or knot the rope to maintain sufficient tension to prevent movement. Without proper securing, cargo can jostle and become damaged, damage the truck or utility bed carrying the cargo, or worse yet, completely fall out of the trailer or bed.

With these problems in utility hauling, what is needed is an easily configurable cargo management system adaptable to a variety of uses that can be easily assembled while still securely holding hauled items.

SUMMARY OF THE INVENTION

Objects, features, and attendant advantages of the present invention will become apparent to those skilled in the art from a reading of the following detailed description of embodiments constructed in accordance therewith, taken in conjunction with the accompanying drawings.

These problems and others are addressed by the present invention which comprises a configurable base formed from a plurality of interlocking tiles that may fit within a frame. Anchoring tiles have receptacles for accepting anchors. Smooth panels support heavy items. Accessories are formed to either attach to the anchor or integrally with the anchor. Accessories include tie downs, sidewalls, cross frame and stanchions, and wheel-chocks. The anchor fits into the receptacles for placement anywhere desired on the base. An embodiment of the anchor has a lock for added security. A coupler provides at least one aperture for securing items, preferably positioned on the frame. An alternative configurable bed is formed by orthogonal cross members arranged within a frame. Open spaces between the orthogonal cross members accept anchors. Another alternative configurable bed is formed from a single tile having a plurality of receptacles. A method of configuring a cargo management system allows a dealer employee to compare customer needs to established footprints, alter the footprint design if needed, and generate a cost estimate for the configuration.

BRIEF DESCRIPTION OF THE DRAWINGS

The invention of the present application will now be described in more detail with reference to preferred embodiments of the apparatus and method, given only by way of example, and with reference to the accompanying drawings, in which:

FIGS. 5A through 5G illustrate embodiments of accessories in accordance with the present invention.

FIGS. 7A through 7C illustrate various utility bed footprints in accordance with the present invention.

DESCRIPTION OF THE PREFERRED EMBODIMENTS

Figure 1:
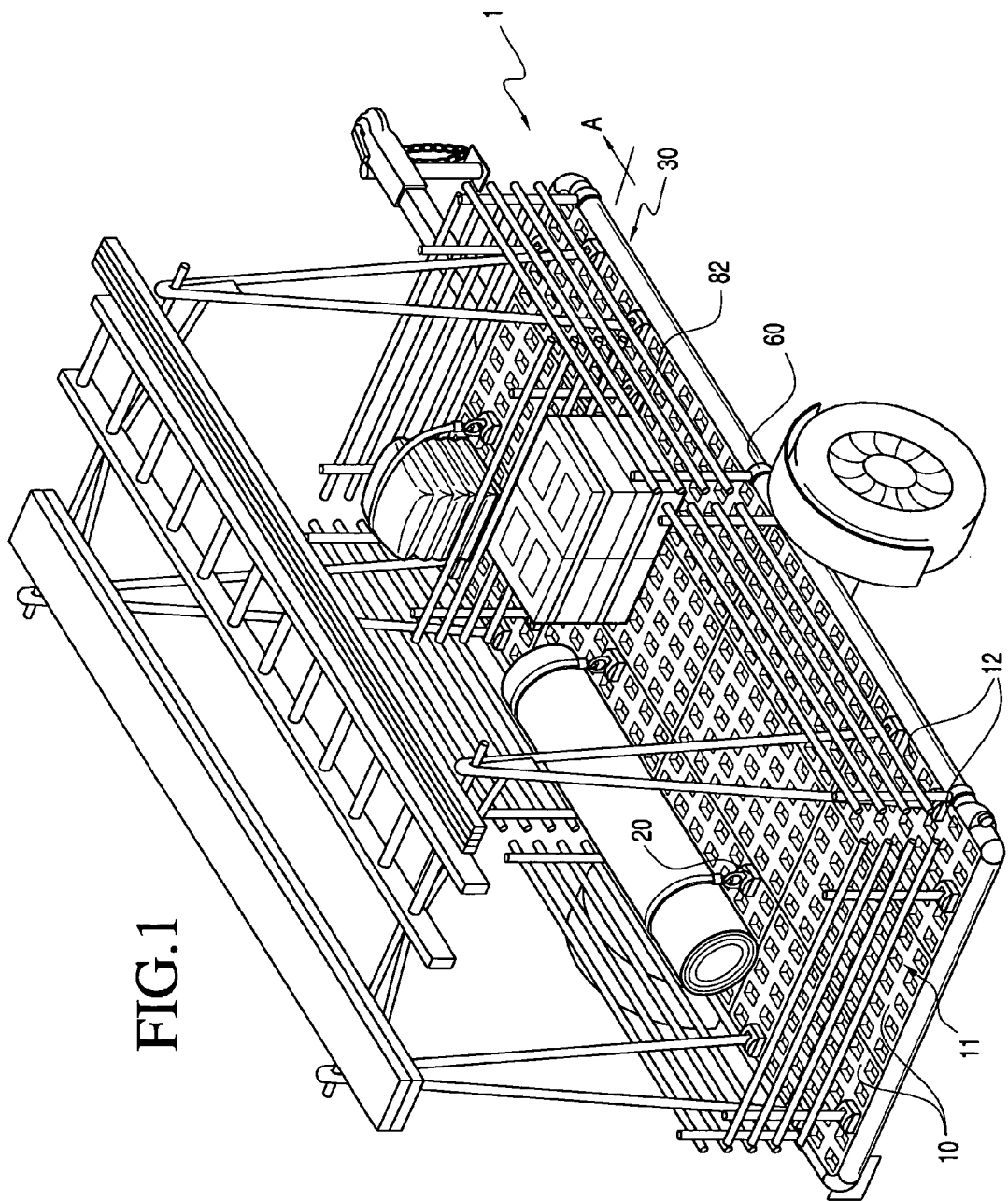
FIG. 1 illustrates an overview of a utility bed in accordance with the present invention.

For the purpose of promoting and understanding of the principles of the invention, reference will now be made to the preferred embodiment illustrated in the drawings.

Referring to FIG. 1, a configurable cargo management system 1 is illustrated comprising a frame 30 and a platform 11 that assembles without the use of tools to carry a variety of items. The platform 11 includes a plurality of anchoring tiles 10 and a plurality of flat tiles 15 (further illustrated in FIG. 2B), wherein the plurality of anchoring tiles 10 are removably interlocked to one another and/or to each of the plurality of flat tiles 15 and to the frame 30. The assembled platform 11 may be of any convenient size, but is preferably 8 feet by 4 feet in dimension, accommodating, but not limited to, standard utility trailer and truck bed sizes. Each of the plurality of anchoring tiles 10 and the plurality of flat tiles 15 are preferably sized to be 2 feet by 1⅓ feet in size, though each tile 10, 15 can be made in other sizes that still accommodate a standard trailer bed size. Alternatively, in embodiments further described below where a frame is not used, the platform 11 can be formed simply from one or more tiles. The platform 11 accepts securing devices, and more particularly anchors and accessories, further described below, for securing cargo to the base.

It will be appreciated by one of ordinary skill in the art that a wide variety of interlocking mechanisms may be used to fit tiles together. For example, press-fittings, slide lock, tongue and groove, snaps, etc. may be used for interlocking the anchoring tiles 10 and flat tiles 15 in accordance with the present invention. Each of the plurality of anchoring tiles 10 and the flat tiles 15 preferably has an interlocking mechanism on each side of the tile. Alternatively, the interlocking mechanism may be integrally formed with the side of the tile.

Figure 2A:
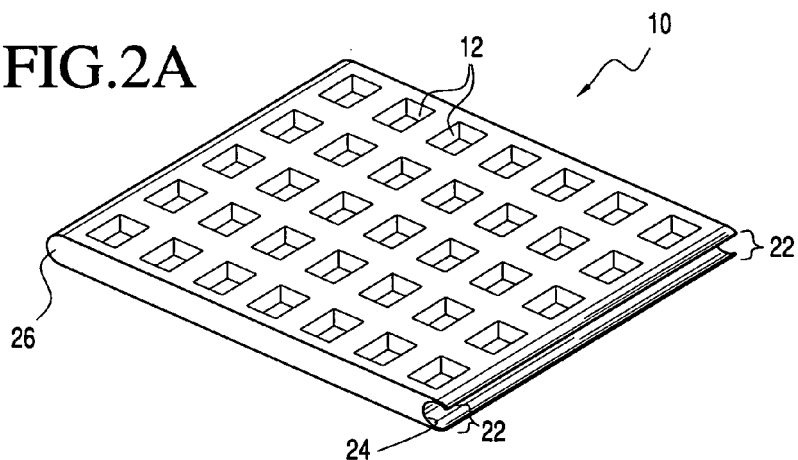
FIGS. 2A, 2B, and 2C illustrate press-fit tiles in accordance with the present invention.
Figure 2B:
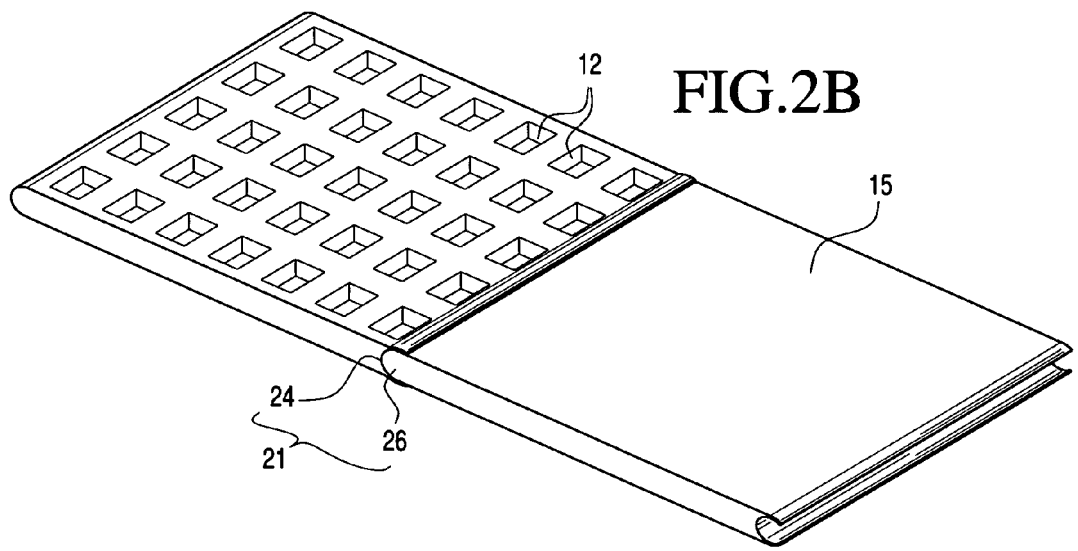
Figure 2C:
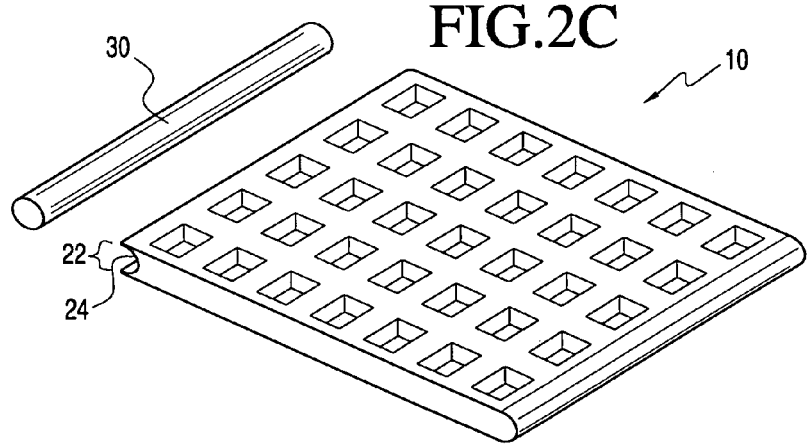

Referring now to FIGS. 2A through 2C, each of the plurality of anchoring tiles 10 has a substantially rectangular shape and includes a plurality of receptacles 12 for, as will be explained in greater detail, receiving an anchor 20. The plurality of receptacles 12 are square shaped, and recess into the first tile 10. It will be appreciated by one of ordinary skill in the art, however, that the receptacles 12 can be formed in a wide variety of shapes without departing from the scope of the present invention. Each of the plurality of the flat tiles 15 simply provides a uniform surface that supports items carried on the platform 11 interlocked to one another and to the frame 30.

A preferred interlocking mechanism to fit the tiles together is a press fitting. Press fitting 21 allows tiles to connect together with a pressure fit are incorporated into the sides of the tile. Preferably, press fitting 21 has a curved portion 24 with an opening 22, which fits around a cylindrical flange 26. As previously described, interlocking mechanisms are positioned on sides of adjacent tiles and, alternatively, the elongated curved portion 24 may formed within one side of either the anchoring tile 10 or the flat tile 15. As illustrated in FIG. 2B, the cylindrical flange 26 of the flat tile 15 mates with the curved portion 24 of adjoining anchoring tile 10 by pressing the cylindrical flange 26 through the opening 22. The curved portion 24 deforms to allow the flange 26 to pass through the opening 22 and rest inside the curved portion 24.

Referring to FIG. 2C, the anchoring tile 10 similarly mates to a frame 30, as further described below, with a press fitting type 21, 26 of interlocking mechanism. Press fittings may be made from a variety of materials that will deform when pressed together, but retain stiffness to support cargo carried on the utility bed 1.

Anchoring tiles 10 and flat tiles 15 are preferably formed from, but not limited to, plastic, steel, or aluminum. The receptacles 12 may be conveniently formed into the anchoring tiles 10 during, for example, the extrusion process or, alternatively, cut into the tile at a later time.

Figure 3:
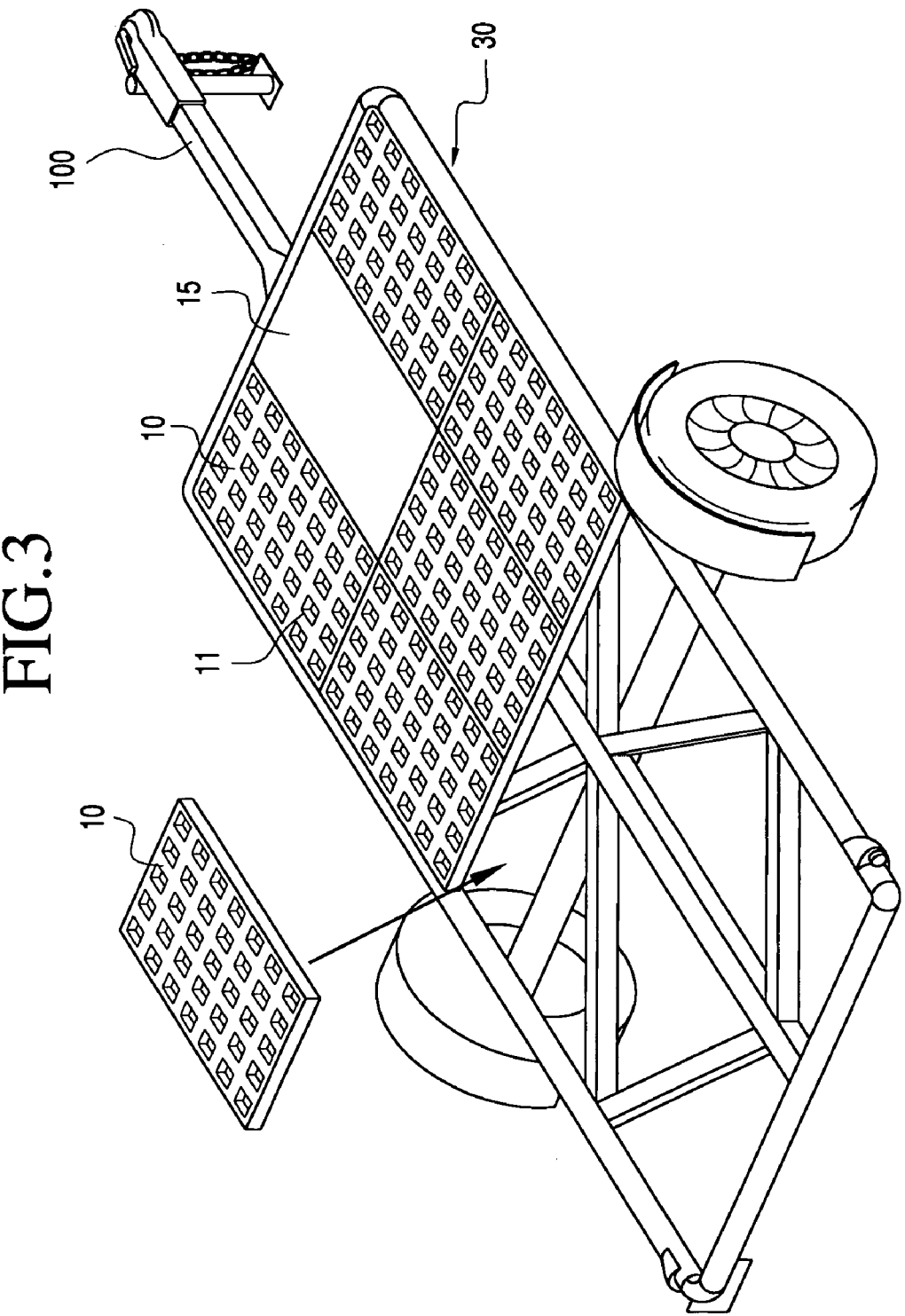
FIG. 3 illustrates assembling a utility bed in accordance with the present invention.

Referring to FIG. 3, assembling a utility bed in accordance with the present invention is illustrated. The frame 30 rests on a standard utility trailer 100 or placed on the flat bed of a pickup truck. Anchoring tiles 10 and flat tiles 15 are removably attached to the frame 30 and to each other to form the platform 11. It will be appreciated by one of ordinary skill in the art that the order and placement of anchoring 10 and smooth 15 tiles can be arranged in a wide variety of configurations to accommodate cargo to be carried on the bed. Once the anchoring tiles 10 and flat tiles 15 are placed inside the frame 30, the platform 11 is formed.

Referring to FIGS. 4A–4D, an anchor 20 in accordance with the present invention is illustrated. The anchor 20 is designed to fit securely into the receptacle 12 and provide an attachment point for securing cargo on the bed. The anchor 20 has a base 31 and a cap 32 preferably integrally formed with the base 31. Preferably, the base 31 has a shape corresponding to fit securely into a receptacle 12. Most preferably, the anchor 20 and receptacle 12 are interlocking. When the anchor 20 is installed in a receptacle 12, the base 31 is positioned in the receptacle 12, and the cap sits above the receptacle 12 and the base 31.

One type of interlocking mechanism for joining the anchor 20 into the receptacle 12 incorporates a means 33 for retaining the anchor 20 in the receptacle 12 and a means 36 for releasing the anchor 20 from the receptacle 12. Preferably, the means 33 for retaining the anchor 20 in the receptacle 12 and the means 36 for releasing the anchor 20 from the receptacle 12 are parts of a cooperative, spring loaded latching mechanism. The means 33 for retaining the anchor 20 in a receptacle 12 protrudes from the side of the base 31 in a normal state due to a spring loading of the means 33. When the anchor 20 is pushed into a receptacle 12, the means 33 for retaining the anchor in the receptacle 12 depresses into the base 31 during insertion and against the spring, then is forced outward by the spring, holding the anchor 20 in the receptacle 12. The means 36 for releasing the anchor 20 from a receptacle 12 attaches to a latch cooperatively engaged to pull the spring away from the means 33 for retaining the anchor 22 in the receptacle 12. Depressing the means 36 for releasing pulls the latch, releasing the spring, and allowing the means 33 for retaining to push into the anchor 20.

Though the means 33 for retaining the anchor 20 in the receptacle 12 and the means 36 for releasing the anchor 20 from a receptacle 12 are preferably a cooperative, spring-loaded latching mechanism, it will be appreciated by one of ordinary skill in the art that many mechanisms can be used to engage the retaining means 33 without departing from the scope of the present invention.

Still referring to FIGS. 4A–4D, a receiving means 34 is formed in the cap 32 and is accessible above the bed while the anchor 20 is installed in a receptacle 12. The receiving means 34 is preferably a cavity formed in the cap 32, and is dimensioned to accept various accessories, further described below.

Figure 4A:
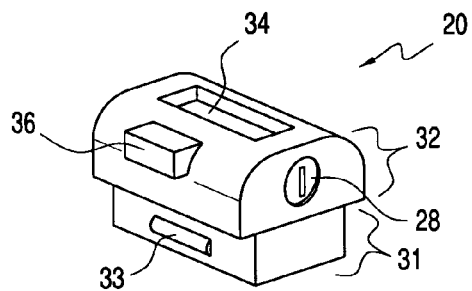
FIGS. 4A, 4B, 4C and 4D illustrate an anchor in accordance with the present invention.
Figure 4B:
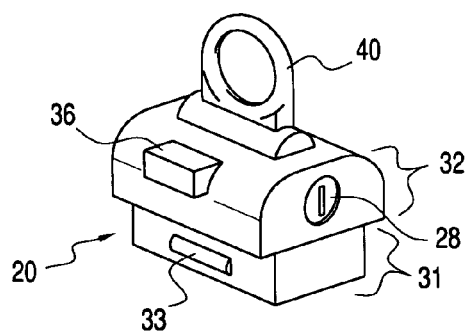
Figure 4C:
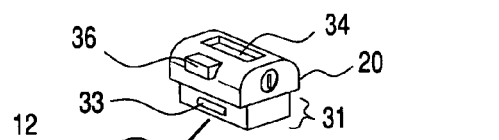
Figure 4C:
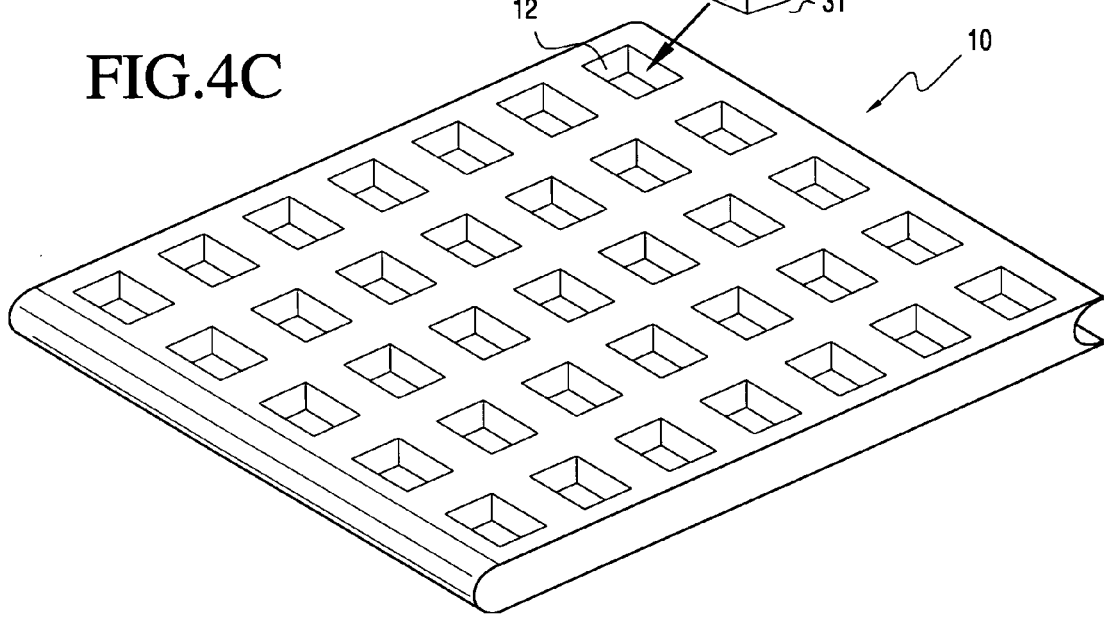
Figure 4D:
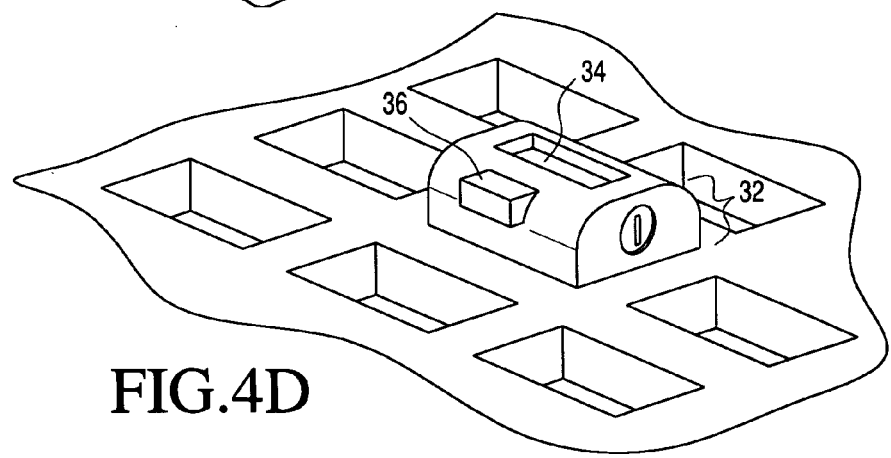

Referring more specifically to FIG. 4B, the anchor 20 includes a ring accessory 40 inserted into the receiving means 34. Preferably, the anchor 20 has a lock 28, and more preferably a keyed lock. When the lock 28 is engaged, neither the means 33 for retaining the anchor 20 in the receptacle 12 nor the means 36 for releasing the anchor 20 from the receptacle 12 can be depressed. In this manner, if the retaining means 33 is installed in a receptacle 12 and locked, it cannot be removed. The lock 28 not only keeps the anchor 20 securely engaged in the receptacle 12 so that it is not inadvertently released and having cargo improperly tied down, but also helps to prevent theft of cargo or parts of the cargo management system 1.

Figure 5A:
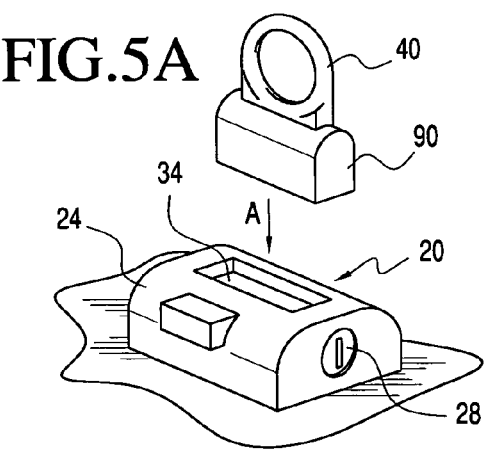
Figure 5D:
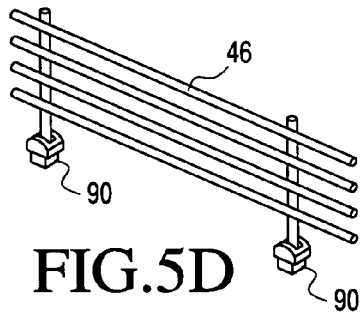
Figure 5B:
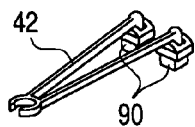
Figure 5C:
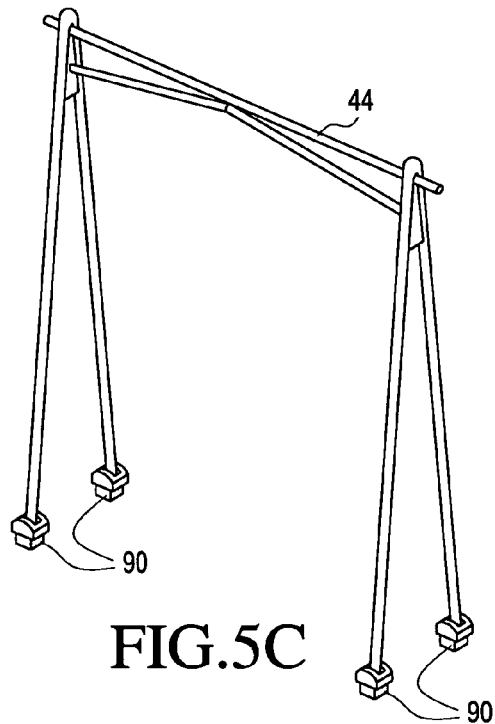
Figure 5F:
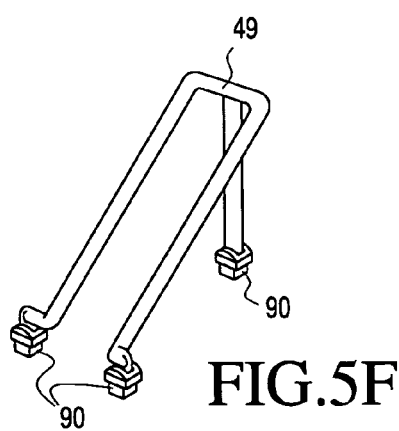
Figure 5E:
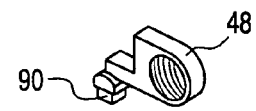

Referring to FIGS. 5A through 5G, a variety of accessories in accordance with the present invention are illustrated. A tie-down accessory 40, a bicycle rack accessory 42, a cross-bar and stanchion frame accessory 44, a fence accessory 46, a tail light accessory 48, and a wheel chock accessory 49, respectively. Each accessory 40, 42, 44, 46, 48, 49 has at least one fitting 90 shaped to fit into the receiving means 34 of the anchor 20. For example, as illustrated in FIG. 5A, a tie-down accessory 40 has a fitting 90. The fitting 90 is placed into the receiving means 34 of the anchor 20 in the direction of arrow A. The fitting 90 can optionally be locked in place by securing lock 28, preventing accessories from being stolen when left unattended.

Though the configurable utility bed system 1 of the present invention is illustrated with exemplary accessories, it will be appreciated by one of ordinary skill in the art that a wide variety of accessories for securing items, which fit into anchors 20 may be used without departing from the scope of the present invention. While the accessories are depicted as separate pieces from anchors, it will be appreciated by one of ordinary skill in the art that accessories and anchors may be formed integrally, and thus no receiving means 34 would be needed in the integrally formed embodiments.

Figure 6A:
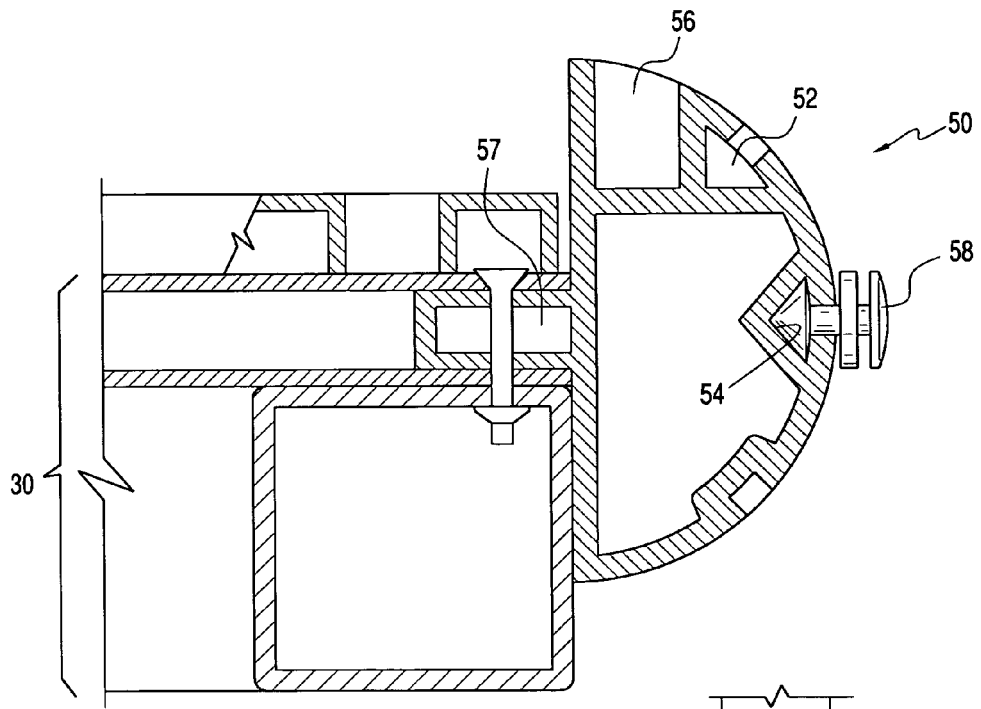
FIGS. 6A and 6B illustrate a frame extrusion in accordance with the present invention.
Figure 6B:
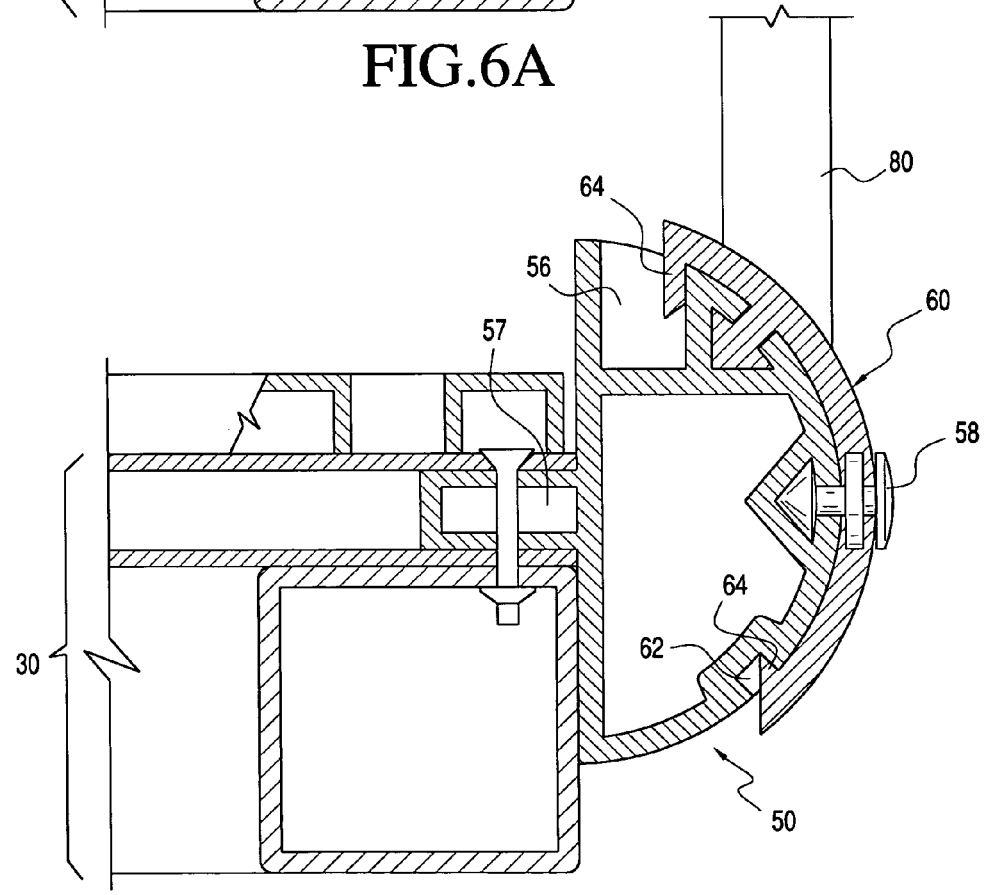

Referring to FIGS. 6A and 6B, a coupler assembly 50 in accordance with the present invention is illustrated. FIG. 6A illustrates a cross-sectional view of the coupler 50 in accordance with the present invention. The cross-section of FIG. 6A is taken at FIG. 1, line A. The coupler 50 may be attached to the frame 30 during manufacturing by bolting an extension 57 to the frame 30. The coupler 50 provides at least one aperture, and preferably at least two apertures, allowing items to be secured without tools. The coupler 50 is made from a hard, but slightly deformable plastic so that securing devices can be both pressed into and retained by the apertures. A preferable type of aperture is a dovetail slot 52, 54. Any attachment fitted with a dovetail pin 58 can be pressed into the dovetail slot 54 and held securely. Another preferable aperture is a vertical slot 56. Attachments such as a panel can be dimensioned to fit exactly into the vertical slot 56 and held in place simply by the weight of the attachment. Attachments can be alternatively made to include a ledge dimensioned to fit exactly into the vertical slot 56 and be held in place by the weight of the attachment. Similarly, it will be appreciated that the attachment may simply be the dovetail pin 58 itself, and accessories may be formed especially for cooperation with that attachment. For example, a strap may have a small hole at one end cut to slip over the dovetail pin, while the other end secures to a tie down accessory inserted within a receptacle.

Though the coupler 50 of FIG. 6A is illustrated with a preferred arrangement of two dovetail slots 52, 54 and a vertical slot 56, it will be appreciated by one of ordinary skill in the art that the type and number of apertures can vary widely without departing from the scope of the present invention.

Referring to FIG. 6B, a preferred attachment for use with the coupler 50 is illustrated. A clip 60 fits around a portion of the circumference of the coupler 50. Hooked ends 64 of the clip 60 fit into apertures, such as the vertical slot 56 and a notch 62 specific to the hooked end 64, holding the clip 60 to the coupler 50. The dovetail pin 58 extends through the clip 60 for securing the clip 60 to the coupler 50. While the hooked ends 64 are illustrated as attaching to a vertical slot 56 and a notch 62, it will be appreciated by one of ordinary skill in the art that a wide variety of openings may be used to accept the hooked ends without departing from the scope of the present invention. Alternatively, the clip 60 may be designed with more dovetail pins and dovetail slots and without hooked ends 64. The clip 60 may also be alternatively designed to have ends that secure the clip by some other means than hooks. It is particularly advantageous to incorporate the clip 60 into an accessory 80. Referring back to FIG. 1, incorporating the clip 60 into a fence accessory 82 with the clip 60 inserted in the coupler 50 is illustrated.

Figure 7B:
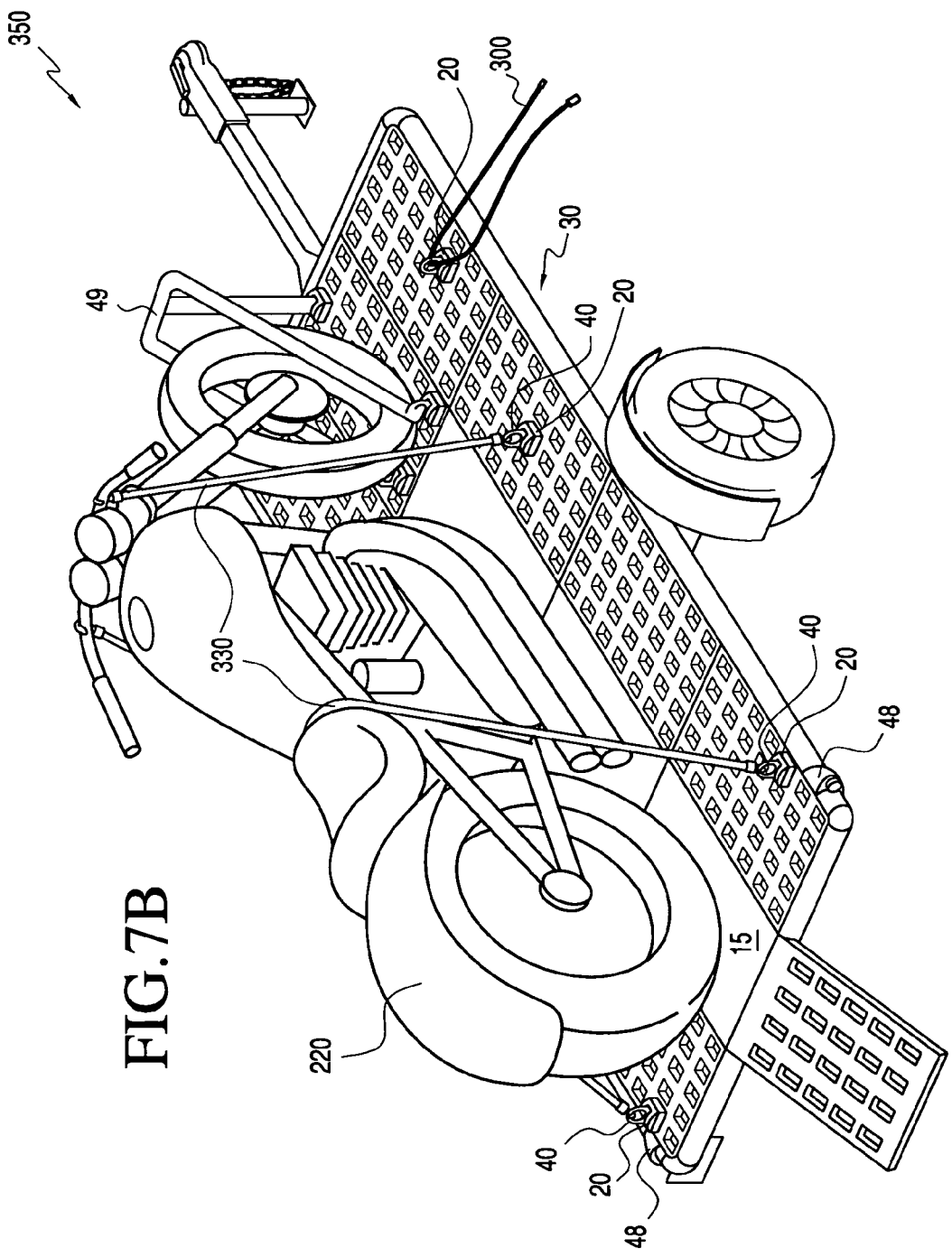
Figure 7C:
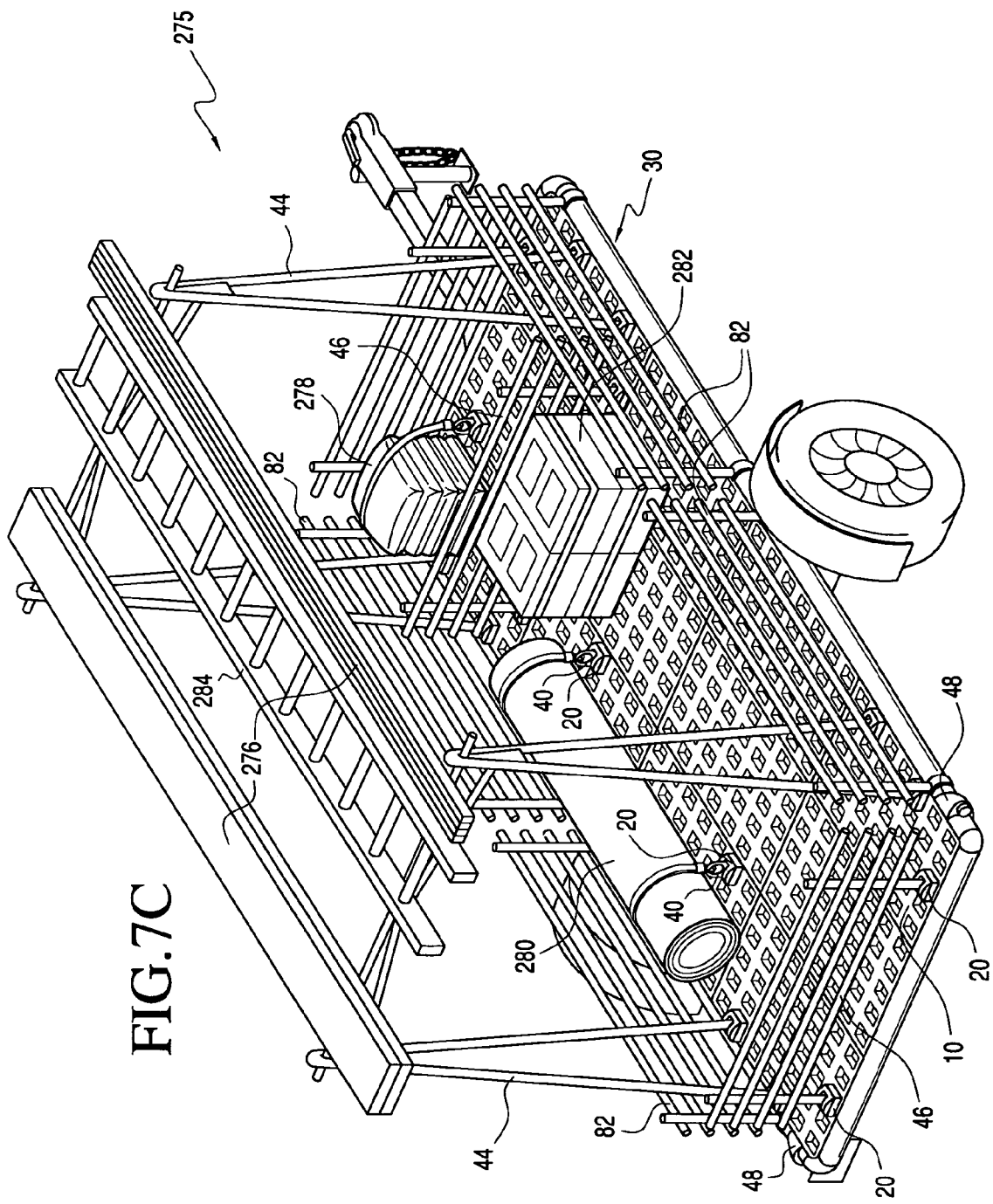

Referring to FIGS. 7A through 7C various, exemplary, utility bed footprints in accordance with the present invention are illustrated. Footprints are specific configurations designed for specific uses. For example, FIG. 7A illustrates an outdoors footprint 200. The cargo to be towed is a kayak 202, a shell 204, two bikes 206, 208, and a cooler 210. Fence accessories 82 having integral clips 60 are inserted into the frame extrusions (not shown). The bed is assembled with ten anchoring tiles 10 and two smooth tiles 15. Bicycle rack accessories 42 and tie down accessories 40 attach to anchor tiles 10 with anchors 20 positioned in receptacles 12. A wire lock 300 is threaded through another tie down accessory 310. The wire lock 300 can then be threaded through the bicycle tires and/or any other items being carried on the utility bed 1 for added security. Two stanchion frame and cross bar accessories 44 are locked into anchors 320 inserted in receptacles 12. The cooler 210 is placed on a smooth tile 15 and held between a smaller fence accessory 322 fit into anchors and a perimeter fence accessory 82 fit into frame extrusions. Any other necessary specialty equipment, for example a Thule™ or Yakima™ kayak kit, can simply be attached to the cross bars as needed.

Referring to FIG. 7B, a power sport footprint 350 is illustrated. Power sports equipment, such as motorcycles 220 (illustrated), personal watercraft, and snowmobiles are very heavy. To carry heavy power sports equipment, the footprint is formed with a support area of smooth tiles 15 for added strength. The remainder of the bed is formed with anchoring tiles 10. A wheel chock 49 with incorporated anchors placed in receptacles 12 to position the wheel chock 49 with the motorcycle 220 centered on the bed. Anchors 20 and tie down accessories 40 are fitted into receptacles. Straps 330 are tied to the motorcycle 220 and the tie down accessories 40 for securing the motorcycle 220 on the bed. It will be appreciated by one of ordinary skill in the art that different accessories may be needed for different types of power sport vehicles. For example, if the cargo were a snowmobile that does not have wheels, a wheel chock would not be used in configuring the utility bed.

Referring to FIG. 7C, a home and garden footprint 275 is illustrated. The cargo to be towed in this example is bags of fertilizer 278, a carpet 280, cinder block 282, lumber 276, a plurality of Cinder blocks 282, and a ladder 284. The base is formed from all anchoring tiles 10. Tail light accessories 48, and fence accessories 82 having integral clips are attached to the frame 30 with frame extrusions. Fence accessories 82 with integral clips keep cargo within the perimeter of the utility bed 1. Fence accessories 46 attach to receptacles 12 in the base with anchors 20, and keep cargo within the bed and also can be used to form smaller, secured areas within the bed. Cross bar and stanchion frame accessories 44 attach to receptacles 12 in the base with anchors 20. The ladder 284 and lumber 276 are tied or otherwise secured to the crossbars. Tie down accessories 40 and anchors 20 are placed on both sides and both ends of the carpet 280. A strap, bungee cord, or the like is run between tie down accessories 40 to secure the carpet 280. Cinder blocks 282 and fertilizer bags 278 are likewise secured with a strap, bungee cord, or the like run between tie down accessories 40. A fence accessory 46 separates the Cinder blocks 282 and fertilizer bags 278 from the carpet 280, so that the blocks 282 or bags 278 won't contact and damage or dirty the carpet 280. More generally, the fence accessory 46 additionally serves to enclose items that may shift position during transport.

Though each foot print illustrates a configuration for carrying specific items, it will be appreciated by one of ordinary skill in the art that the foot prints presented are but a few examples of the wide variety of utility bed configurations that can be formed with the tiles 10, 15, frame, frame extrusions 50, attachments, anchors 20, and accessories in accordance with the present invention.

Figure 8:
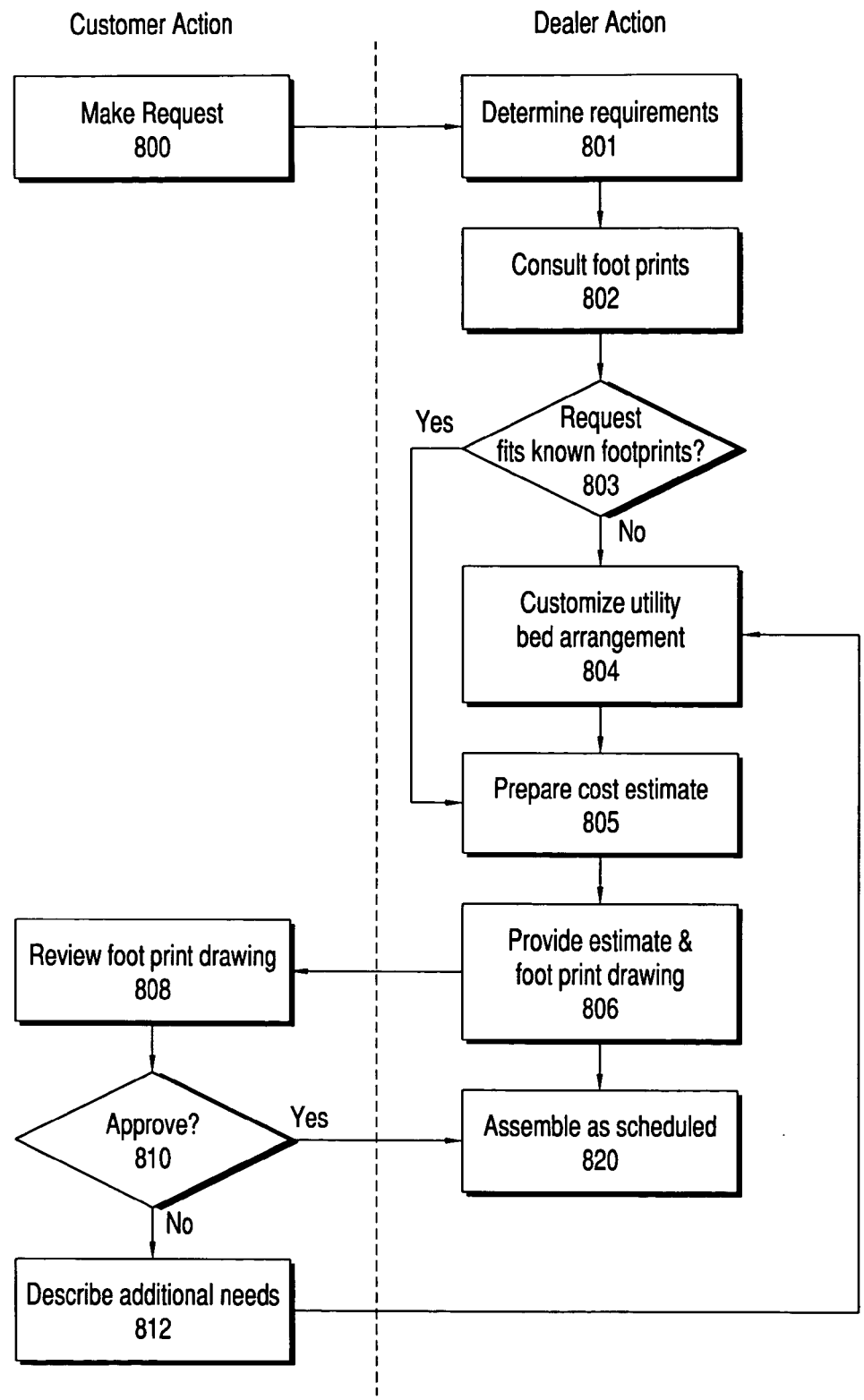
FIG. 8 illustrates a method of providing custom utility bed footprints.

Referring to FIG. 8, a method of providing custom utility bed footprints is illustrated. A dealer renting utility trailers receives configurable utility bed system parts from a manufacturer or distributor. The dealer particularly receives anchor tiles, smooth tiles, frames, anchors, and accessories, as well as a variety of footprints describing commonly used custom utility bed configurations. A customer needing a utility bed configuration calls the dealer and describes the cargo to be carried 800. A dealer employee determines the requirements, i.e., what type of bed configuration would be needed, to carry the described cargo 801. The employee consults known footprints 802 and determines whether the cargo can be carried with a known footprint 803. If the customer's needs are not satisfied by a known footprint, a dealer employee can either adjust and existing footprint or design a new one him or herself 804. In either case (step 803 or 804), the employee then forms a cost estimate for the utility bed configuration from 805.

The employee next provides the designed footprint and associated cost estimate to the customer 806. The customer reviews the footprint and cost estimate and determines whether they will rent the equipment 808. If the customer approves the design and cost 810, the customer notifies the dealer, and the dealer prepares the custom configured utility trailer for pick up and use on the date or dates scheduled 820. However, if the customer is not satisfied with the design, the customer can describe any desired additional needs or changes 812. The dealer employee then repeats the steps of preparing the customized design 804, preparing the associated cost estimate 805, and providing the design and estimate to the customer 806. This process, i.e., steps 804, 805, 806, 808, 810, and 812 can be repeated until the customer is satisfied. Once the customer is satisfied, as previously described, the customer notifies the dealer, and the dealer prepares the custom configured utility trailer for pick up and use on the date or dates scheduled 820.

The process of providing a custom utility bed configuration as illustrated in FIG. 8 can be accomplished with either paper or paperless systems, or a combination of the two. However, in a preferred embodiment, existing footprints are accessed with computer software, and designing the footprint is performed with the software, loaded on a dealer computer. The software package automatically generates the cost estimates based upon the components needed to form the custom utility bed and the time of the rental. Footprints and cost estimates can be either printed out and transmitted to the customer, or can simply be sent electronically, such as via electronic mail.

Figure 9A:
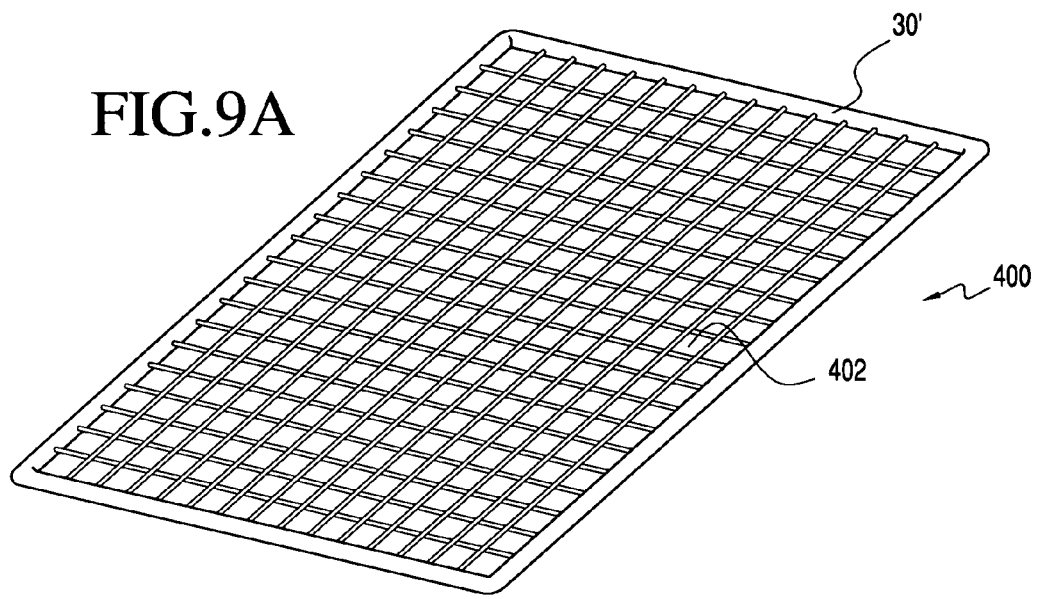
FIGS. 9A–9C illustrate alternative embodiments of a custom configurable utility bed in accordance with the present invention.
Figure 9B:
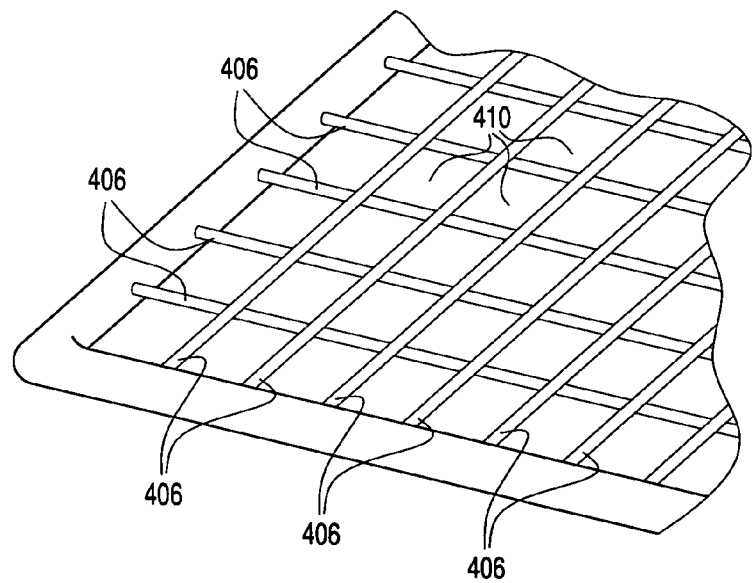

Referring to FIGS. 9A and 9B, an alternative embodiment of a custom configurable utility bed in accordance with the present invention is illustrated. In the alternative embodiment, a single piece bed 400 is formed from an open mesh 402 within a frame 30'. Orthogonal cross members 406 are arranged perpendicular to each other to form the mesh 402. The arrangement is made such that the spaces 410 between the orthogonal cross members 406 are sized to receive anchors 20. Anchors 20 and accessories work with the alternative embodiment as previously described.

Figure 9C:
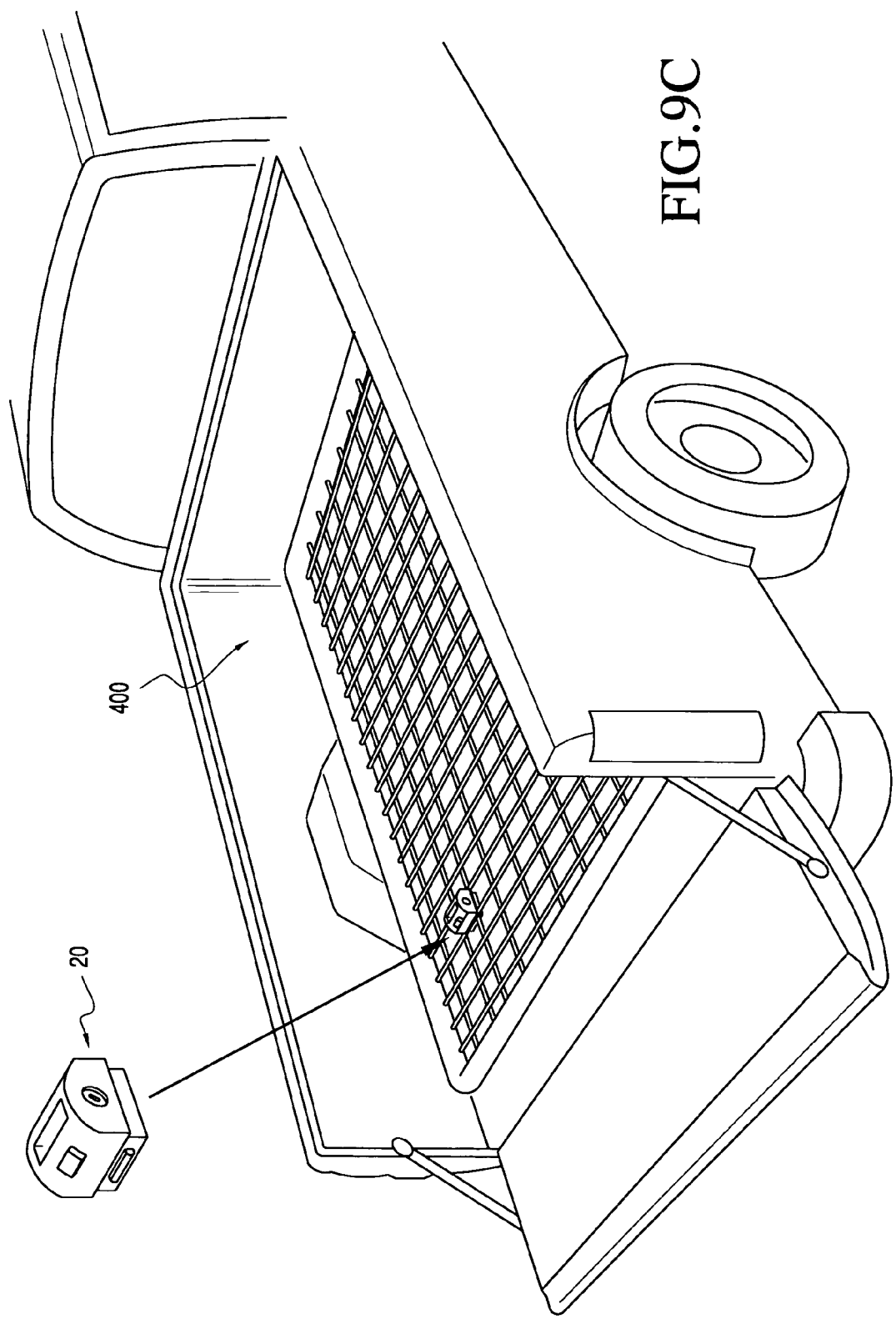

Referring FIG. 9C, the single piece bed 400 is illustrated installed within the bed of a pickup truck. The single piece bed 400 works substantially the same as the configurable utility bed 1 described above. Anchors 20 and accessories are used as previously described to configure the single piece bed 400 for securing whatever cargo is to be carried.

It will be appreciated by one of ordinary skill in the art that both the configurable utility bed 1 and the single piece bed embodiments 400 can be adapted for used with both trailers and truck beds. When either bed type 1, 400 is used with a truck bed, however, couplers 50 may optionally be used if there is sufficient clearance around the sides of the frame 30.

An alternative embodiment of a single piece bed is formed from a single anchor tile 10 with a plurality of receptacles 12 having a dimension that conforms to a standard trailer or truck bed size. As previously discussed, standard trailer or truck bed sizes tend to be 8 feet by 4 feet in dimension. However, an embodiment used in a truck bed may be slightly altered to accommodate wheel wells. For example, the tile may be cut slightly smaller than a 4 foot width, or simply have cut-outs allowing the tile to fit around wheel wells while also using the wheel wells to stabilize the tile within the truck bed.

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A cargo management system for carrying cargo, comprising:
    a platform formed of at least one tile comprising at least one receiving means;
    at least one anchor configured and dimensioned to removably fit into said at least one receiving means, said at least one anchor further comprising a second receiving means;
    at least one accessory configured and dimensioned to removably fit into said at least one anchor second receiving means for supporting or securing said cargo on said platform; and,
    wherein said platform further comprises at least one smooth tile.

2. The cargo management system of claim 1, wherein said at least one receiving means is a receptacle.

3. The cargo management system of claim 1, wherein said at least one tile is a plurality of anchoring tiles.

4. The cargo management system of claim 3, further comprising a frame bounding a support surface, and wherein said plurality of anchoring tiles are disposed on said support surface inside said frame.

5. The cargo management system of claim 3, wherein each of said plurality of anchoring tiles further comprises an interlocking mechanism for securing said plurality of anchoring tiles to each other.

6. The cargo management system of claim 5, wherein said interlocking means further comprises an elongated flange and an elongated flange-receiving opening.

7. The cargo management system of claim 6, wherein said elongate flange is disposed along a side of adjoining anchoring tile and said elongated flange-receiving opening is disposed along a side of a second adjoining anchoring tile.

8. The cargo management system of claim 5, wherein said interlocking mechanism is integral with said at least one plurality of anchoring tiles.

9. The cargo management system of claim 3, wherein each of said plurality of anchoring tiles is formed from a material selected from the group consisting of plastic, steel, or aluminum.

10. The cargo management system of claim 1, wherein said at least one anchor and said at least one accessory are integrally formed.

11. The cargo management system of claim 1, wherein said at least one accessory is selected from the group consisting of a tie down accessory, a wheel chock accessory, a bicycle rack accessory, a cross-bar and stanchion frame accessory, a fence accessory, and a tail light accessory.

12. The cargo management system of claim 1, wherein said at least one anchor further comprises a retaining means for removably securing said at least one anchor within said receiving means, and a releasing means for releasing said at least one anchor from said receiving means.

13. The cargo management system of claim 12, wherein said retaining means and said releasing means comprise identical back-to-back hermaphroditic snap together siding parts.

14. The cargo management system of claim 1, wherein said at least one anchor further comprises a lock for locking and unlocking said at least one anchor in said receiving means.

* * * * *